(12) United States Patent
Maienschein et al.

(10) Patent No.: US 7,665,587 B2
(45) Date of Patent: Feb. 23, 2010

(54) TORQUE TRANSMISSION DEVICE

(75) Inventors: Stephan Maienschein, Baden-Baden (DE); Gunnar Back, Buehl-Oberweier (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 379 days.

(21) Appl. No.: 11/481,769

(22) Filed: Jul. 6, 2006

(65) Prior Publication Data

US 2007/0017766 A1      Jan. 25, 2007

(30) Foreign Application Priority Data

Jul. 7, 2005    (DE) .................. 10 2005 031 781

(51) Int. Cl.
*F16H 45/02*    (2006.01)
*F16D 13/68*    (2006.01)

(52) U.S. Cl. .................... 192/3.28; 192/55.61

(58) Field of Classification Search ............. 192/200, 192/213, 70.19
See application file for complete search history.

(56) References Cited

U.S. PATENT DOCUMENTS

| 4,475,640 | A  | * | 10/1984 | Takeuchi et al. | ......... 192/70.17 |
| 5,407,041 | A  | * | 4/1995  | Fukunaga et al. | ......... 192/3.29 |
| 6,615,962 | B2 | * | 9/2003  | Back et al. | ......... 192/3.28 |
| 2006/0006040 | A1 | * | 1/2006 | Orlamunder et al. | ...... 192/70.18 |

\* cited by examiner

*Primary Examiner*—Rodney H Bonck
(74) *Attorney, Agent, or Firm*—Simpson & Simpson, PLLC

(57) ABSTRACT

The invention relates to a torque transmission device with a clutch disk or friction plate that is connected by way of positive locking sections to an input part of a torsional vibration damping device so that they turn together but it can be slid axially. In order to produce a torque transmission device, by which the shifting quality of a converter bridge clutch in a hydrodynamic torque converter can be improved, the input part of the torsional vibration damping device has, in the circumferential direction between two positive locking sections, a seat area for one end of a spring shackle that extends from the clutch disk.

5 Claims, 2 Drawing Sheets

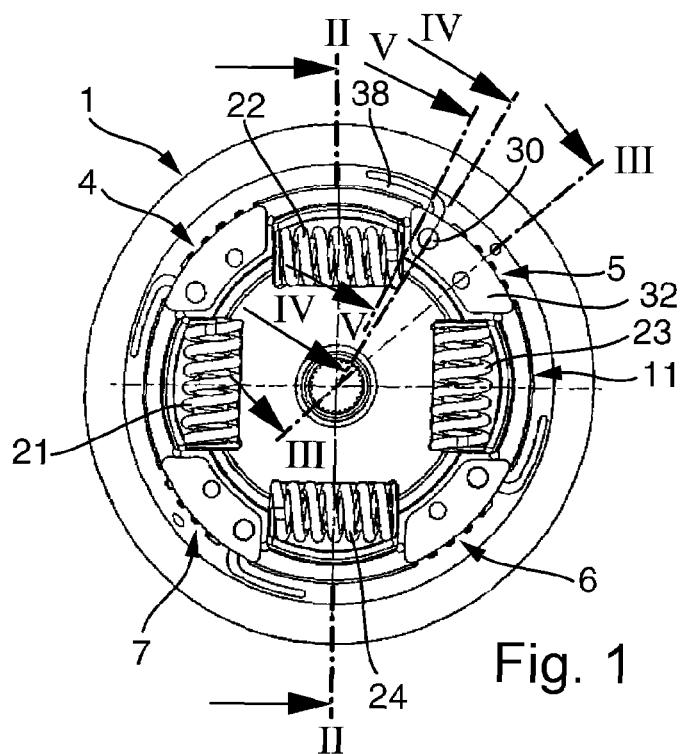
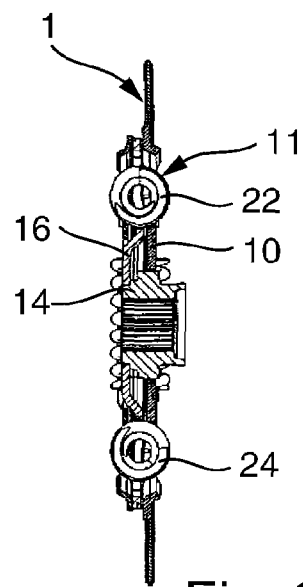
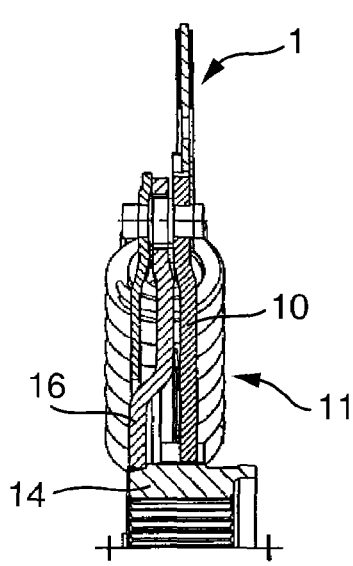
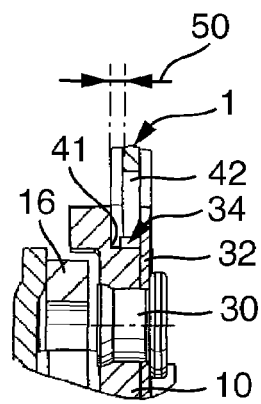
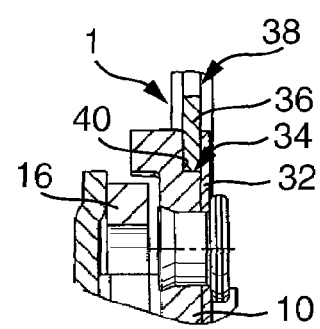
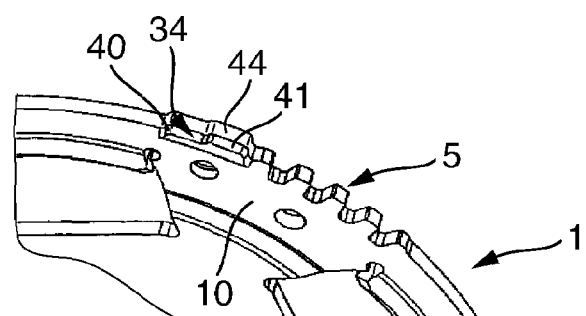
Fig. 1
Fig. 2
Fig. 3
Fig. 4
Fig. 5
Fig. 6

TORQUE TRANSMISSION DEVICE

CROSS REFERENCE TO RELATED APPLICATIONS

This patent application claims priority of German Patent Application No. 10 2005 031 781.2 filed Jul. 7, 2005, which application is incorporated herein by reference.

FIELD OF THE INVENTION

The invention relates to a torque transmission device with a clutch disk or friction plate that is connected to an input part of a torsional vibration damping device by way of positive locking sections so that they rotate together but can be slid axially.

BRIEF SUMMARY OF THE INVENTION

In a preferred embodiment, the torque transmission device includes a seat area, in the axial direction, which is at least somewhat larger than the end of the spring shackle. Because of the size difference, the maximum spring travel of the clutch disk is limited in the axial direction.

In another preferred embodiment, the torque transmission includes a seat area which is limited in one axial direction by a support rib that is formed on the input part of the torsional vibration damping device. The support rib preferably extends in the circumferential direction of the input part of the torsional vibration damping device and is connected with it to form one part.

In another preferred embodiment, the seat area is limited in the other axial direction by a support plate that is fastened on the input part of the torsional vibration damping device. The support plate is fastened, for example, using rivet connections on the input part of the torsional vibration damping device.

The invention also relates to a hydrodynamic torque converter with a driving pump wheel and a driven turbine wheel that is arranged in a housing so that it can turn, which can be fastened on the driven shaft of a combustion engine and has a previously described torque transmission device.

The object of the invention is to produce a torque transmission device according to the preamble of claim 1, by which the shifting quality of a converter bridge coupling in a hydrodynamic torque converter can be improved.

The object, in a torque transmission device with a clutch disk or friction plate that is connected to an input part of a torsional vibration damping device by way of positive locking sections so that they rotate together but can be slid axially, is achieved in that the input part of the torsional vibration damping device, in the circumferential direction between two positive locking sections, has a seat area for one end of a spring shackle that preferably acts in axial direction and extends from the clutch disk. Because of this, the torque transmission functions and axial suspension of the clutch disk are uncoupled from each other. This offers the advantage that the service life of the torque transmission device is clearly increased.

Other advantages, characteristics and details of the invention can be seen from the following description, in which an embodiment is described in detail with reference to the drawings. In this case, the characteristics mentioned in the claims and in the description are relevant to the invention, either each alone or in any combination.

BRIEF DESCRIPTION OF THE DRAWINGS

In the following, the invention will be described with reference to the attached drawings in which:

FIG. 1 shows a top view of the present invention torque transmission device;

FIG. 2 shows a cross-sectional view of the torque transmission device, shown generally along the II-II line in FIG. 1;

FIG. 3 shows a cross-sectional view of the torque transmission device, shown generally along the III-III line in FIG. 1;

FIG. 4 shows a cross-sectional view of the torque transmission device, shown generally along the IV-IV line in FIG. 1;

FIG. 5 shows a cross-sectional view of the torque transmission device, shown generally along the V-V line in FIG. 1;

FIG. 6 shows a perspective view of a cutout of an input part of the present invention; and, FIG. 7 shows a cross-sectional view of the torque transmission device shown in FIG. 1 in a torque converter.

DETAILED DESCRIPTION OF THE INVENTION

Figure 7:
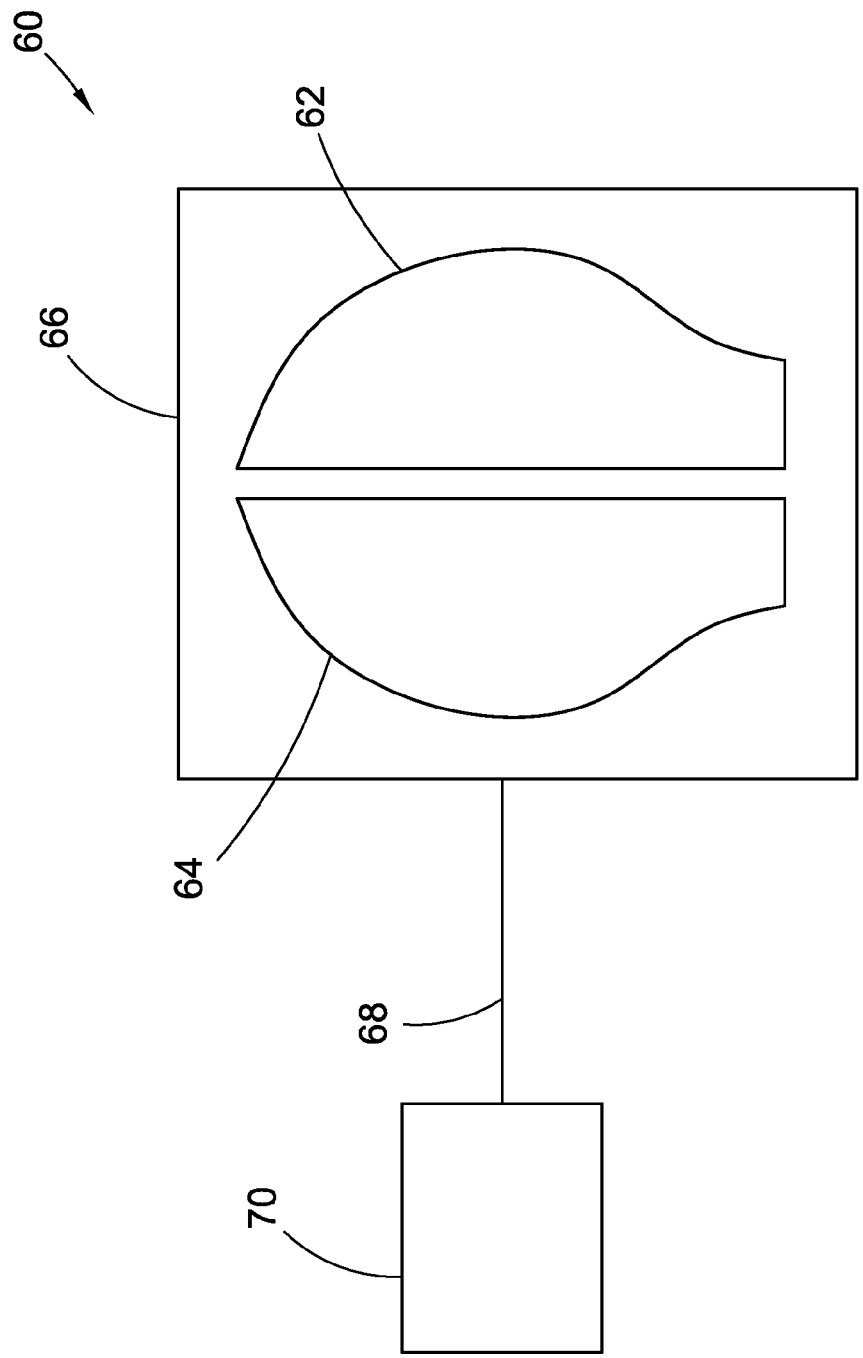

FIGS. 1 through 6 show clutch disk 1, which is also called a friction plate, with a bridge coupling (not shown), at least as a cutout, in different views. The bridge coupling is arranged inside a converter drive housing of a hydrodynamic torque converter that can be connected to an engine and has an input part designed as a piston.

Clutch disk 1 is connected to input part 10 of torsional vibration damping device 11 by way of four positive locking sections 4 to 7 so that they rotate together. Positive locking sections 4 to 7 comprise an internally geared section formed radially inside on clutch disk 1, which are in engagement with externally geared sections that are designed radially on the outside on input part 10 of torsional vibration damping device 11. In this case, positive locking sections 4 to 7 are designed so that clutch disk 1 can move in the axial direction relative to input part 10 of torsional vibration damping device 11.

Radially on the inside, input part 10 is attached to hub part 14 so that it can turn. On hub part 14, output part 16 of torsional vibration damping device 11 is attached. Output part 16 of torsional damping device 11 is coupled in a known manner by way of helical pressure springs 21 to 24, which are also called torsion springs, to input part 10 of torsional vibration damping device 11.

On input part 10 of torsional vibration damping device 11, with the use of rivet connection 30, support plate 32 is fastened that limits seat area 34 in an axial direction. Seat area 34 is used to hold one end 36 of spring shackle 38 that acts in the axial direction, which extends from clutch disk 1 and partially extends in the circumferential direction. Seat area 34 has one relatively short section 40 in the axial direction and one section 41 that is expanded in the axial direction. On section 40 that is relatively short axially, end 36 of spring shackle 38 comes to rest. On section 41 that is expanded in the axial direction, radial inner edge area 42 of clutch disk 1 comes to rest. The distance between radial inner edge area 42 and axially expanded section 41 of seat area 34 is designated with reference number 50 in FIG. 4. Two sections 40, 41 of seat area 34 are formed on support rib 44 that is connected to form one piece with input part 10 of torsional vibration damping device 11.

FIG. 7 shows a cross-sectional view of the torque transmission device shown in FIG. 1 in a torque converter. Clutch disc 1 is disposed in torque converter 60, which includes pump wheel 62, turbine wheel 64, and housing 66.

REFERENCE NUMBERS 1 clutch disk
4 positive locking section
5 positive locking section
6 positive locking section
7 positive locking section
10 input part
11 torsional vibration damping device
14 hub part
16 output part
21 helical pressure spring
22 helical pressure spring
23 helical pressure spring
24 helical pressure spring
30 rivet connection
32 support plate
34 seat area
36 end
38 spring shackle
40 section
41 axially expanded section
42 radially inner edge area
44 support rib
50 spacing
60 torque converter
62 pump wheel
64 turbine wheel
66 housing
68 driven shaft
70 engine

What is claimed is:

1. A torque transmission device, comprising: a torsional damping device (11) with an input part (10) and a clutch disk (1), wherein the input part (10) includes respective first portions of a plurality of locking sections (4-7), the first portions formed from a same piece of material as the input part (10), and a plurality of seat areas (34), wherein the clutch disk (1) includes a plurality of spring shackles (38), the spring shackles formed from a same piece of material as the clutch disk (1), with respective ends (36) and includes respective second portions of the plurality of locking sections (4-7), the second portions formed from the same piece of material as the clutch disk (1), wherein the plurality of locking sections connect the input part (10) and the clutch disk (1) so that the input part (10) and the clutch disk (1) are turnable together and are axially slidable with respect to one another and wherein a respective seat area (34) from the plurality of seat areas (34) is circumferentially disposed between adjacent sections from the plurality of locking sections (4-7).

2. The torque transmission device defined in claim 1 wherein the seat area (34, 41) is at least partially larger than the end (36) of the spring shackle (38) in axial direction.

3. The torque transmission device defined in claim 2 wherein the seat area (34, 41) is limited in axial direction by a support rib (44) that is formed on the input part (10) of the torsional vibration damping device (11).

4. The torque transmission device defined in claim 1 wherein the seat area is limited in axial direction, by a support plate (32) that is fastened on the input part (10) of the torsional vibration damping device (11).

5. A hydro dynamic torque converter with a driving pump wheel and a driven turbine wheel that is mounted in a housing so that it can turn, which can be fastened on the driven shaft of a combustion engine comprising: a torsional damping device (11) with an input part (10) and a clutch disk (1), wherein the input part (10) includes respective first portions of a plurality of locking sections (4-7), the first portions formed from a same piece of material as the input part (10), and a plurality of seat areas (34) and the clutch disk (1) includes a plurality of spring shackles (38), the spring shackles formed from a same piece of material as the clutch disk (1), with respective ends (36) and includes respective second portions of the plurality of locking sections (4-7), the second portions formed from the same piece of material as the clutch disk (1), wherein the plurality of locking sections connect the input part (10) and the clutch disk (1) so that the input part (10) and the clutch disk (1) are turnable together and are axially slidable with respect to one another and wherein a respective seat area (34) from the plurality of seat areas (34) is circumferentially disposed between adjacent sections from the plurality of locking sections (4-7).

* * * * *